Dec. 11, 1945.   C. F. MARSCHNER   2,390,803
PROCESS AND APPARATUS FOR MANUFACTURING PLASTIC ARTICLES
Filed May 19, 1943
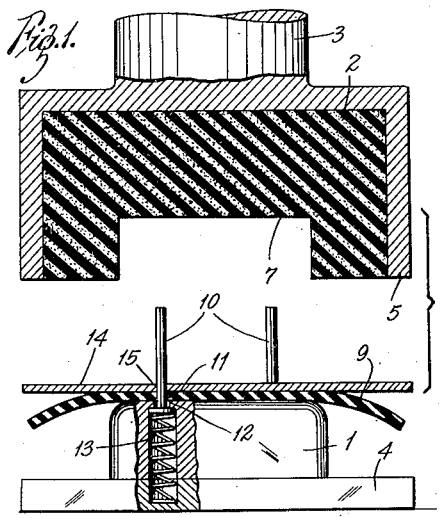
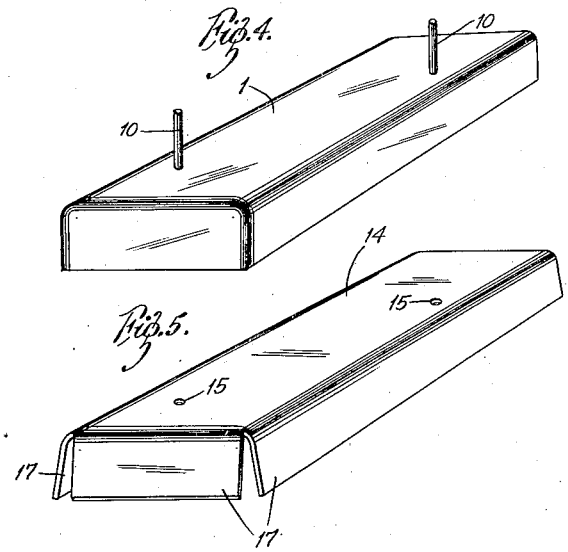
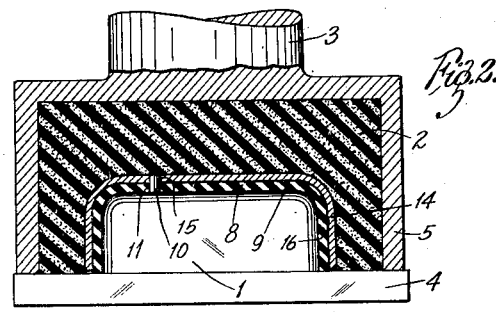
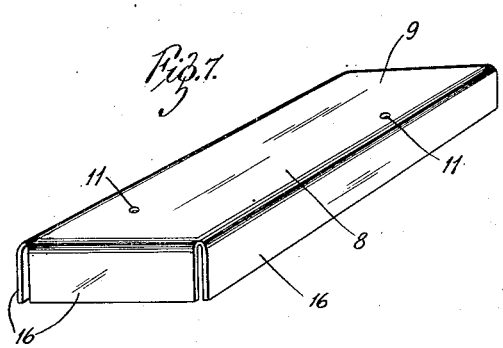
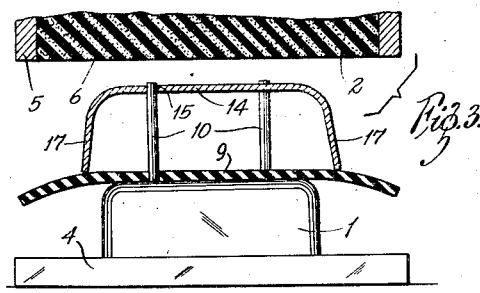
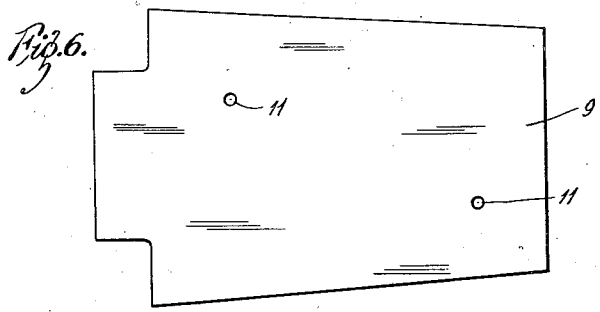
INVENTOR:
Charles F. Marschner,
by Carr Van Kpravely,
HIS ATTORNEYS Patented Dec. 11, 1945

2,390,803

UNITED STATES PATENT OFFICE 2,390,803

PROCESS AND APPARATUS FOR MANUFACTURING PLASTIC ARTICLES

Charles F. Marschner, Normandy, Mo., assignor to McDonnell Aircraft Corporation, St. Louis, Mo., a corporation of Maryland Application May 19, 1943, Serial No. 487,580

2 Claims. (Cl. 18—19)

This invention relates principally to the manufacture of plastic articles, particularly marginally flanged plastic articles, and has for its principal object to devise an economical and practical process of and apparatus for accurately forming such plastic articles. Another object is to enable such plastic articles to be formed with metal and rubber die members substantially the same as those heretofore employed in the die-shaping of similar sheet metal parts. Other objects are to protect the rubber die member from the heat of the plastic part and to prevent the plastic part from sticking to the rubber die member. The invention consists in interposing between the resilient and rigid die members a sheet metal intermediate die member which is deformed by the resilient die member to conform the blank to the rigid die member.

In the accompanying drawing, which forms part of this specification and wherein like symbols refer to like parts wherever they occur, Fig. 1 is a side elevational view of a die set employed in carrying out my process, showing the rubber die member in raised position, the plastic blank mounted on the male die member, and the sheet metal intermediate die member mounted on said blank, Fig. 2 is a view similar to Fig. 1, showing the rubber die member engaged with the sheet metal intermediate die member to form the marginally flanged plastic part, Fig. 3 is a view similar to Fig. 1, showing the shape of the intermediate sheet metal die member after the first die shaping operation, and a rubber die member having a flat operating surface, Fig. 4 is a perspective view of the rigid die member, Fig. 5 is a perspective view of the intermediate die member shown in Fig. 3, Fig. 6 is a plan view of the plastic blank; and Fig. 7 is a perspective view of the finished plastic part.

In the accompanying drawing my invention is shown embodied in a die set of the kind heretofore employed in the die shaping of marginally flanged sheet metal parts. Said die set comprises a stationary lower or male die member 1 and an upper or female die member 2 adapted for movement with a vertically reciprocable press-ram 3 into and out of operative relation to said male die member. The male die member 1 comprises a rigid, substantially rectangular forming block, which is made of aluminum, lead or other heat conducting material and is supported on a suitably heated base member or plate 4 adapted to be mounted in the die press below the press-ram 1 thereof. The vertically movable upper die member 2 comprises a block or body of rubber or other elastic or fluid-like material that is confined within a downwardly opening housing 5 provided therefor in the head of the press-ram 3 and is constrained by said housing from lateral expansion when said rubber pad or body is compressed under vertical pressure. The rubber die member 2 shown in Fig. 3 has a flat bottom or operating surface 6. However, the rubber die member shown in Fig. 1 is preferably formed with a recess or pocket 7 in its underside in order to conserve rubber and to obtain a more uniform molding pressure.

The marginally flanged plastic article or part 8 shown in Fig. 7 is die shaped or molded from the plastic blank 9 shown in Fig. 6. The blank 9, which may be made of thermoplastic or thermosetting plastic, is mounted on the rigid male die member or forming block 1 and is properly positioned thereon with its margins overhanging the sides thereof by means of locating pins 10 that project upwardly from said block through tooling holes 11 provided therefor in said blank. The locating pins 10 are mounted in vertical holes 12 provided therefor in the top of the male die or forming block 1 and are preferably supported therein on springs 13, whereby said pins are adapted to move downwardly with the rubber female die member 2 when engaged thereby.

The die set also comprises a third or intermediate die member or element 14 in the form of a sheet of aluminum, lead, deep drawing steel or other relatively soft ductile or pliable material. The intermediate sheet metal die member 14 is laid over the plastic blank 9 and is properly positioned thereon by means of the locating pins 10 which extend upwardly through positioning holes 15 provided therefor in said die member.

After the plastic blank 9 is mounted in the die set in the manner shown in Fig. 1, the rubber female die member 2 moves downwardly into engagement with the flat sheet metal intermediate die member 14 and forces the overhanging marginal portions of said sheet metal die member and said plastic blank downwardly and inwardly towards the corresponding sides of the heated male die member or forming block 1 to form the flanged marginal portions 16 of the finished plastic article or part 8. During this operation, the vertical pressure on the resilient die member 2 causes the rubber or fluid-like body thereof to flow around the forming block 1 and evenly distributes the pressure uniformly over the entire area of the sheet metal intermediate die element 14; and said intermediate die element, in turn, uniformly transmits and distributes such pressure over the entire area of the plastic blank 9 thus accurately conforming the same to the surface of said forming block. After the first use of the intermediate die element 14 of the die set, said element assumes the obliquely flanged shape shown in Fig. 3. The fact that the sheet metal intermediate die member 14 is flanged downwardly, as at 17, after the first forming operation necessitates the use of the long locating pins 10, which move downwardly under the pressure of the rubber die element 2 so as to protect the surface thereof. After the sheet metal die element 14 has assumed the shape shown in Fig. 3, it retains such shape during subsequent molding operations, except for the slight amount of springback in the flanges 17 after the molding pressure of the rubber die member 2 thereon is released. The purpose of shaping the sheet metal die element 14 in the first molding operation is to assure proper clearance between the male and female die members during subsequent molding operations.

The hereinbefore described invention has several important advantages. It permits plastic parts to be formed in a die set heretofore used for the die shaping of sheet metal parts; and it dispenses with the expensive metal cavity or female die members heretofore employed in the compression molding of plastic parts. The sheet metal intermediate die member provides an economical and practical means for obtaining the proper clearance between the male and female die members; it also protects the rubber die member from the heat of the hot plastic and prevents the plastic from fusing itself to said rubber die member; and it also insures a smoother surface on the finished plastic part. In use, the sheet metal intermediate die element is coated with a lubricant which prevents said die element from sticking to the plastic part. This ductile sheet metal intermediate die member is also well adapted, under the uniformly distributed pressure of the rubber die member to conform the plastic part to the surfaces of the forming block, whether such surfaces be plane or of compound curvature.

Obviously, one or both of the male and intermediate die members may be heated in any desired manner and the shape of the die members changed for different plastic articles without departing from the invention.

What I claim is:

1. The process of molding marginally flanged plastic parts which consists in laying a flat sheet plastic blank directly upon the top of a heated rigid forming block with the margins of said sheet plastic blank overhanging the sides of said heated rigid forming block, laying on said plastic blank a ductile flat sheet metal blank of similar size and shape and then forcing a confined body of flowable material against substantially the entire area of the upper surface of said ductile sheet metal blank with sufficient pressure to bend said overhanging margins of said plastic and ductile sheet metal blanks against the sides of said block and conform both blanks to the top and sides of said block, whereby the conformed ductile sheet metal blank produced in the above molding operation may be used in the molding of other such plastic parts.

2. A die set for producing marginally flanged plastic parts comprising a heated rigid forming block adapted to support a plastic blank with the margins of said blank overhanging the sides of said block, a ductile sheet metal intermediate die member having depending marginal flanges adapted to seat on said blank beyond said sides of said block, and a rubber die member movable into engagement with the outer surface of said ductile intermediate die member to conform the latter and said plastic blank to the top and sides of said forming block, said ductile intermediate die member being initially a flat sheet formed into flanged condition by the operation of said die set.

CHARLES F. MARSCHNER.